United States Patent [19]

Stephenson et al.

[11] Patent Number: 4,793,430
[45] Date of Patent: Dec. 27, 1988

[54] HITCH AND DRIVE STRUCTURE FOR PTO-DRIVEN, SEMI-INTEGRAL IMPLEMENT

[75] Inventors: Roger D. Stephenson, Bloomfield; James C. Walters; Craig A. Richardson, both of Ottumwa, all of Iowa

[73] Assignee: Deere & Company, Moline, Ill.

[21] Appl. No.: 123,518

[22] Filed: Nov. 20, 1987

[51] Int. Cl.⁴ .................... B60K 25/10; A01B 71/06
[52] U.S. Cl. .................... 180/14.4; 172/47; 172/125; 172/677
[58] Field of Search .............. 180/14.4, 53.1; 280/415 A, 456 A; 172/47, 125, 667

[56] References Cited

U.S. PATENT DOCUMENTS

| | | | |
|---|---|---|---|
| 4,366,877 | 1/1983 | Vissers et al. | 180/53.1 |
| 4,525,987 | 7/1985 | Werner et al. | 56/15.2 |
| 4,714,123 | 12/1987 | Ermacora et al. | 180/14.4 |
| 4,738,461 | 4/1988 | Stephenson et al. | 180/14.4 X |

*Primary Examiner*—David M. Mitchell
*Assistant Examiner*—Mitchell J. Hill

[57] ABSTRACT

A hitch adapter is used to couple a PTO-driven implement to a three-point hitch arrangement of a towing tractor. The implement includes a transmission housing mounted for rotation about an upright axis that passes through a ball connection effected between a drawbar of the hitch adapter and the implement tongue. The tractor power take-off shaft is connected by a telescopic drive shaft to an input shaft supported by the transmission housing for rotation about an axis extending perpendicular to and intersecting said upright axis. Provided for steering the transmission housing for maintaining the input shaft disposed in parallel relationship to the tractor power take-off shaft is a steering assembly including a pair of steering arms depending from the housing and engaging diametrically opposite locations of a cylindrical guide surface of a guide member fixed to the drawbar with the guide surface arranged concentrically to an axis located in a plane containing the previously mentioned axes and intersecting the upright axis at the ball connection.

5 Claims, 2 Drawing Sheets

HITCH AND DRIVE STRUCTURE FOR PTO-DRIVEN, SEMI-INTEGRAL IMPLEMENT

BACKGROUND OF THE INVENTION

The present invention relates to agricultural implements and more particularly relates to a combined hitch adapter and transmission assembly for allowing a towing tractor, having a power take-off or PTO shaft coupled to an input shaft of the transmission to turn sharply without damaging driven components of the implement nor the drive for such components.

In co-pending U.S. patent application Ser. No. 927,467 filed on 6 Nov. 1986 there is disclosed an agricultural implement including a hitch adapter having a drawbar coupled to the implement draft tongue by a hitch ball connector. An implement drive transmission includes a gearbox or housing mounted to the draft tongue for pivoting about an upright axis passing through the bal connector. An input shaft is mounted in the housing for rotation about an axis extending perpendicular to the upright axis and is adapted for connection to a tractor PTO shaft. A steering arm is vertically pivotally attached to the transmission housing and carries a ball slidably located in a fore-and-aft extending guide channel fixed to the adapter and having sidewalls shaped complementary to the ball. While the steering arm and guide channel cooperate so as to maintain the input shaft in a disposition which would be parallel to the tractor PTO shaft during turning of the hitch adapter about the upright axis, it has been found that the steering arm and guide channel will effect an incorrect "steering" of the input shaft when the hitch adapter rolls about an axis extending crosswise to the upright axis.

SUMMARY OF THE INVENTION

According to the present invention there is provided a novel hitch adapter and transmission assembly for use in implements of the type adapted to be towed by a tractor and having apparatus adapted to be powered by the tractor PTO shaft and more specifically there is provided a gear housing steering assembly which represents an improvement over the steering assembly disclosed in the afore-described, co-pending U.S. patent application Ser. No. 927,467.

An object of the invention is to provide an implement having a hitch adapter and transmission housing mounted to an implement draft tongue as described above and having a steering assembly aperatively coupled between the transmission housing and hitch adapter for steering the housing to follow pivoting of the hitch adapter about the upright pivot axis of the housing while permitting, without inducing a steering action, the hitch adapter to roll relative to the housing about a second axis extending through a ball hitch connection between the hitch adapter and implement draft tongue and intersecting the upright axis.

A more specific object is to provide an implement, as set forth above, wherein the steering assembly includes a guide member fixed to the hitch adapter and having a cylindrical surface arranged concentric to the second axis and a steering arm or follower means fixed to the transmission housing and having opposite portions slidably engaged with diametrically opposite locations on the cylindrical surface.

Yet another object is to provide a steering assembly, as specifically defined above, wherein the guide member is tubular and the steering arm means is defined by a pair of parallel angle members.

These and other objects, features and advantages of the present invention will become apparent to those skilled in the art from the description which follows and from the drawings.

DESCRIPTION OF THE PREFERRED EMBODIMENT

Figure 1:
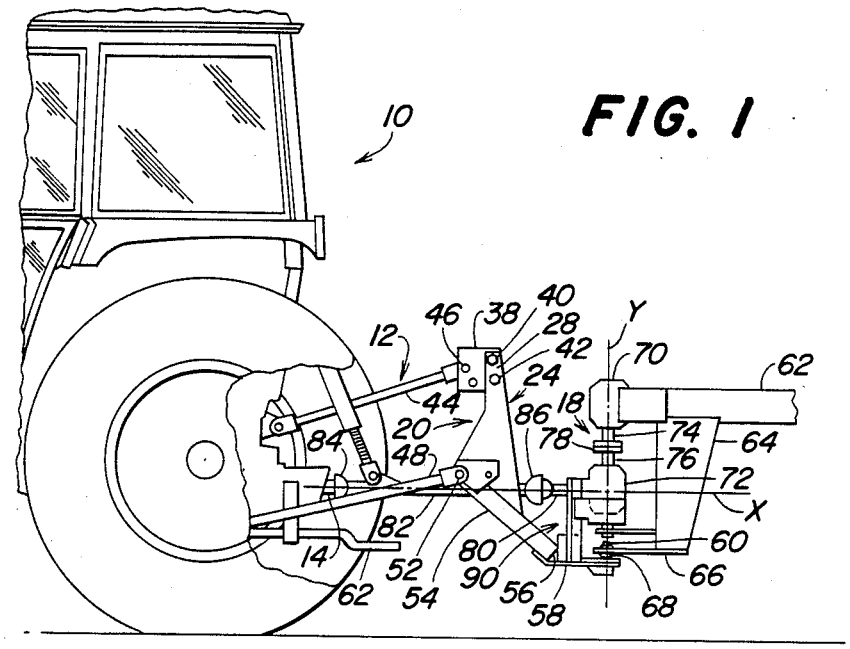
FIG. 1 is a left side elevational view showing a tractor three-point hitch and PTO shaft coupled to an implement having a hitch adapter and transmission housing and associated steering structure constructed in accordance with the principles of the present invention.
Figure 2:
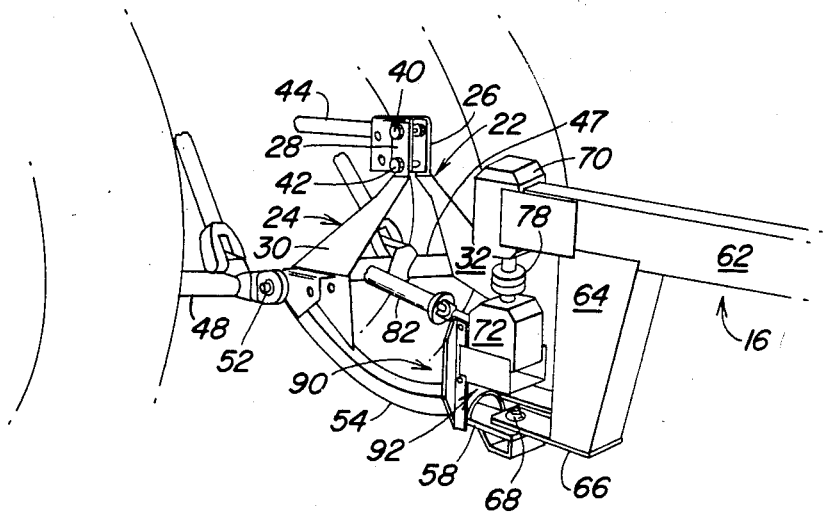
FIG. 2 is a left rear perspective view of the structure shown in FIG. 1.

Referring now to the drawings, there is shown a rear portion of a tractor 10 provided with a three-point hitch 12 and a power take-off shaft 14 to which an agricultural implement having a tongue 16 and transmission or drive assembly 18 is semiintegrally coupled for being towed and driven by the tractor.

Specifically, the tongue 16 is coupled directly to the threepoint hitch 12 by a hitch adapter 20 including an upright mast structure defined by right and left legs 22 and 24, respectively, including respective upright, parallel spaced upper end portions 26 and 28 from which respective central portions 30 and 32 diverge downwardly to upright, parallel spaced lower end portions 34 and 36. A U-shaped channel member 38 is received between the upper end portions 26 and 28 and secured thereto by upper and lower fasteners 40 and 42, respectively. An upper link 44 of the three-point hitch 12 is coupled to the member 38 by a coupling pin 46 while lower links 47 and 48 of the hitch are coupled to the lower end portions 34 and 36 by respective coupling pins 50 and 52. A bowed cross member 54 has its opposite end portions respectively joined to the bottoms of the legs 22 and 24 and includes a central portion 56 which, as viewed in FIG. 1, is spaced downwardly and rearwardly from the leg bottoms. A fore-and-aft extending drawbar 58 is secured, as by weldment, to the cross member central portion 56 and carries an upright stud 60 at its distal end. As shown in FIG. 1, the drawbar 58 is in a normal working position wherein it is generally horizontally disposed at an elevation commensurate with that of tractor drawbar 62.

The implement tongue 16 includes a fore-and-aft extending box beam 62 having a depending structural member 64 secured thereto adjacent the forward end thereof. Fixed to the bottom of the member 64 and projecting forwardly therefrom is a horizontal hitch plate 66 carrying a ball connector 68 that is received on the drawbar stud 60.

The transmission assembly 18 includes an upper right-angle gear housing or box 70 fixed to the forward end of the box beam 62 and which supports a lower right angle gear housing or box 72 by means of an input shaft 74 journalled in the housing 70, an output shaft 76 journalled in the housing 72 and a sprocket and chain coupler assembly 78 joining the shafts 74 and 76. The shafts 74 add 76 lie along an upright axis Y that passes through the ball connector 68 and the lower gear housing 72 may swivel about the axis Y. An input shaft 80 is journalled in the housing 72 for rotation about an axis X extending perpendicular to and intersecting the axis Y. Power from the PTO shaft 14 is delivered to the input shaft 80 by a telescopic drive shaft 82 having its forward and rearward ends respectively coupled to the shafts 14 and 80 by universal joints 84 and 86.

Figure 3:
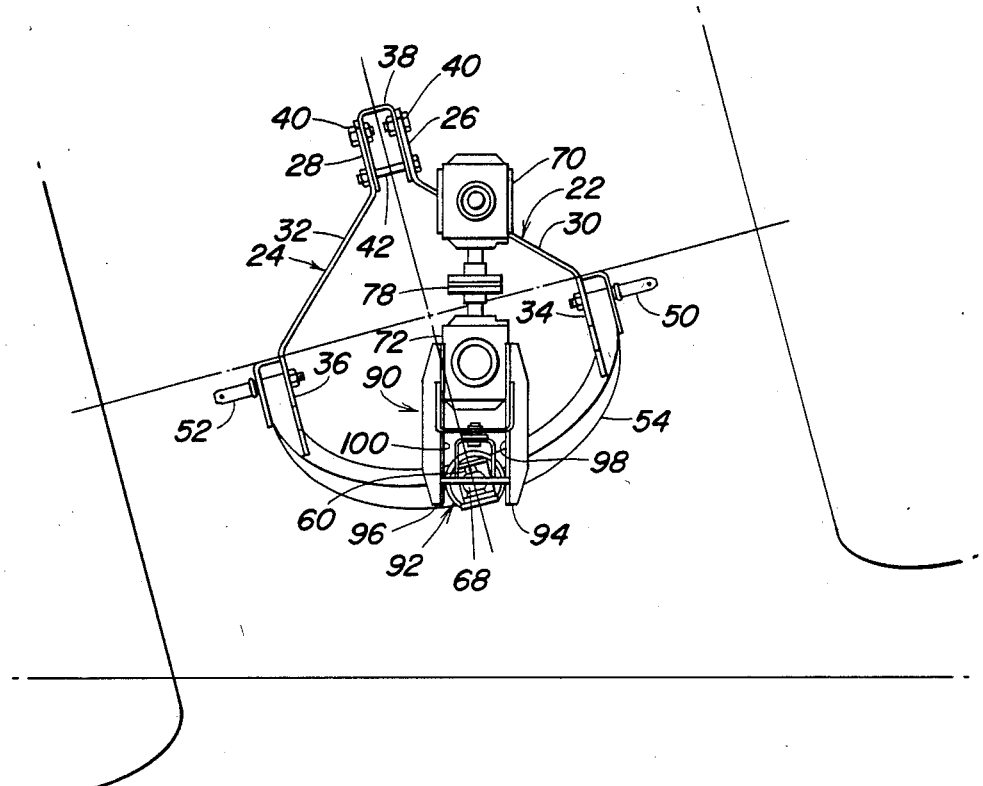
FIG. 3 is a rear view showing the relative position that the implement transmission and hitch adapter occupy with the tractor rolled to the left relative to the implement.

Provided for steering the lower gear housing 72 so that it maintains a parallel relationship to the PTO shaft 14 to ensure that the universal joints are not operated at angles which could result in the drive of the implement being accelerated at unacceptable levels is a steering assembly 90. The assembly 90 includes a guide member 92 in the form of a partial cylindrical tube welded or otherwise fixed to the top of the drawbar 58 with the cylindrical surface being disposed upwardly from the drawbar and concentrically to an axis located in a plane containing the axes X and Y and extending through the ball connector 68. The steering assembly 90 further includes steering arm or follower means comprising right and left steering members 94 and 96 formed from angle members fixed to opposite sides of the lower gear housing 72 and having lower end portions straddling the guide member 92 and having respective flat surfaces 98 and 100 engaged with diametrically opposite portions of the guide member. Since the tractor 10 and, hence, the hitch adapter 20 roll about the ball connector 68 relative to the implement tongue 16, it will be appreciated that the steering members will remain in contact (see FIG. 3) with the guide member 92 throughout such rolling so that guide member 92 will cooperate with the steering members 94 and 96 to effect steering of the gear housing 72 in the event that the tractor turns about the axis Y while rolling about the ball connector 68 but will have no effect on the housing 72 in the event no turning of the tractor is taking place during such rolling.

We claim:

1. In an agricultural implement requiring power to be delivered thereto by a towing tractor and including a draft tongue, a hitch adapter adapted for connection to a tractor three-point hitch and having a rearwardly projecting central portion coupled to a forwardly projecting member of the draft tongue by a spherical hitch ball connector, an implement drive including a transmission housing supported on the draft tongue for rotation about an upright first axis passing through the hitch ball connector, an input shaft supported in said housing along a second axis extending perpendicular to and intersecting the upright first axis and being adapted for connection to a tractor PTO shaft and a steering structure operatively coupled between said housing and the hitch adapter for maintaining the input shaft in parallel relationship to the PTO shaft, the improvement comprising: said steering structure including a guide member fixed to the hitch adapter adjacent said rearwardly projecting central portion and having an abutment surface formed concentrically to a third axis located in a plane containing the first and second axes and passing through the ball connector; and a steering arm means fixed to said housing and including end portions engaging diametrically opposite locations on said abutment surface whereby rolling motion of the hitch adapter about said third axis relative to the draft tongue will not effect any steering motion of said housing about the upright axis.

2. The agricultural implement defined in claim 1 wherein said guide member is tubular.

3. The agricultural implement defined in claim 1 wherein said steering arm means includes a pair of parallel members fixed to said housing.

4. The agricultural implement defined in claim 1 wherein said rearwardly projecting central portion of the hitch adapter extends directly beneath said housing and has said guide member fixed integrally therewith; and said steering arm means depending from said housing in perpendicular relationship to the direction of the second and third axes.

5. The agricultural implement defined in claim 4 wherein said steering arm means includes a pair of parallel angle members each having one flat surface engaged with the abutment surface of the guide member.

* * * * *